(12) United States Patent
Zhou et al.

(10) Patent No.: US 10,585,305 B2
(45) Date of Patent: Mar. 10, 2020

(54) DISPLAY SCREEN AND DISPLAY DEVICE

(71) Applicant: XIAMEN TIANMA MICRO-ELECTRONICS CO., LTD., Xiamen (CN)

(72) Inventors: Hongbo Zhou, Xiamen (CN); Qiaohua Zheng, Xiamen (CN); Yuping Ma, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 33 days.

(21) Appl. No.: 15/715,108

(22) Filed: Sep. 25, 2017

(65) Prior Publication Data

US 2018/0011373 A1    Jan. 11, 2018

(30) Foreign Application Priority Data

Jun. 30, 2017   (CN) .......................... 2017 1 0522665

(51) Int. Cl.
| | | |
|---|---|---|
| *G02F 1/1335* | (2006.01) | |
| *G02F 1/1333* | (2006.01) | |
| *G02F 1/1339* | (2006.01) | |
| *G02F 1/1345* | (2006.01) | |
| *G02F 1/1362* | (2006.01) | |

(52) U.S. Cl.
CPC ...... *G02F 1/133528* (2013.01); *G02F 1/1339* (2013.01); *G02F 1/13338* (2013.01); *G02F 1/13454* (2013.01); *G02F 1/133514* (2013.01); *G02F 1/136286* (2013.01); *G02F 2001/133388* (2013.01); *G02F 2201/58* (2013.01); *G02F 2202/28* (2013.01)

(58) Field of Classification Search
CPC .................................................. G02F 1/13338
See application file for complete search history.

(56) References Cited

U.S. PATENT DOCUMENTS

2011/0163332 A1* 7/2011 Ma ...................... H01L 51/5237
257/88
2012/0105400 A1* 5/2012 Mathew ............... H04N 5/2251
345/207

(Continued)

FOREIGN PATENT DOCUMENTS

CN          106843389 A       6/2017

*Primary Examiner* — Michael H Caley
*Assistant Examiner* — Mariam Qureshi
(74) *Attorney, Agent, or Firm* — Kilpatrick Townsend & Stockton, LLP

(57) ABSTRACT

The present disclosure discloses a display screen and a display device, wherein the display screen comprises a display area and a non-display area; the display area comprises a first opening area, and the non-display area comprises a first non-display area and a second non-display area; the second non-display area is embedded in the first opening area; the first non-display area surrounds the display area and the second non-display area; the display screen comprises a front sensor, a first substrate and a second substrate; the first substrate covers the display area, the first non-display area and the second non-display area, and the second substrate covers the display area, the first non-display area and the second non-display area; the front sensor is arranged in the second non-display area; and the first substrate and the second substrate allow light to pass through at respective positions corresponding to the second non-display area.

19 Claims, 9 Drawing Sheets

(56) References Cited

U.S. PATENT DOCUMENTS

| | | | |
|---|---|---|---|
| 2014/0063407 A1* | 3/2014 | Kwon | G02F 1/13338 |
| | | | 349/58 |
| 2016/0011633 A1* | 1/2016 | Watanabe | G02F 1/1333 |
| | | | 345/184 |
| 2016/0202515 A1* | 7/2016 | Watanabe | G02F 1/1339 |
| | | | 349/153 |
| 2017/0054251 A1* | 2/2017 | Moseke | H01R 13/6275 |
| 2017/0335144 A1* | 11/2017 | Mitsui | C09J 139/06 |
| 2018/0090398 A1* | 3/2018 | Park | G02F 1/1309 |
| 2018/0157362 A1* | 6/2018 | Kim | G06F 3/0412 |
| 2018/0349719 A1* | 12/2018 | Lius | G06K 9/00885 |

\* cited by examiner

DISPLAY SCREEN AND DISPLAY DEVICE

CROSS-REFERENCE TO RELATED APPLICATION

This application is related to and claims priority from Chinese Patent Application No. 201710522665.2, filed on Jun. 30, 2017, entitled "Display Screen and Display Device," the entire disclosure of which is hereby incorporated by reference for all purposes.

TECHNICAL FIELD

The present disclosure generally relates to the technical field of display, specifically to a liquid crystal display technology, and particularly to a display screen and a display device.

BACKGROUND

With the widespread use of display screens, people increasingly hope that a display screen has a larger image display area and a smaller frame, hence, the screen-to-body ratio of the display screen is required to be larger and larger. Therefore, the frame of the display screen is continuously compressed and narrowed.

Besides, in addition to displaying images, the display screen usually can achieve other additional functions, for example, a temperature detection function, a positioning function, an image shooting function, and the like. These additional functions can be implemented by means of sensors and other components arranged in the display screen. In these sensors, there are some front sensors, such as a front optical sensor which can be arranged on an identical side with a displayed picture.

In a usual display screen, the front optical sensor is placed in a non-display area outside a rectangular display area. However, the traditional non-display area for placing the front optical sensor hinders further increase of the screen-to-body ratio of the display screen. As a result, there is a phenomenon that a front sensor cannot be placed in some display screens requiring a high screen-to-body ratio, or the screen-to-body ratio of the display screen with a front sensor cannot be further increased.

SUMMARY

In view of the above problems in the related art, the present invention provides a display screen and a display device to solve at least part of the technical problems described in the background section.

An embodiment of the present disclosure provides a display screen. The display screen includes a display area and a non-display area; the display area includes a first opening area, and the non-display area includes a first non-display area and a second non-display area; the second non-display area is embedded in the first opening area; the first non-display area surrounds the display area and the second non-display area; the display screen includes a front sensor, a first substrate and a second substrate; the first substrate covers the display area, the first non-display area and the second non-display area, and the second substrate covers the display area, the first non-display area and the second non-display area; the front sensor is arranged in the second non-display area; and the first substrate and the second substrate allow light to pass through at respective positions corresponding to the second non-display area.

According to the display screen provided by the embodiment of the present disclosure, by dividing the non-display area into the first non-display area and the second non-display area, setting the first opening area in the display area, embedding the second non-display area in the first opening area, and setting the front sensor in the second non-display area, the arrangement of the front sensor in the display screen cannot be influenced even if the width of the first non-display area is reduced. Therefore, while the screen-to-body ratio of the display screen is improved, the front sensor may be arranged in the display screen to achieve a corresponding additional function.

BRIEF DESCRIPTION OF THE DRAWINGS

Other features, objectives and advantages of the present disclosure will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
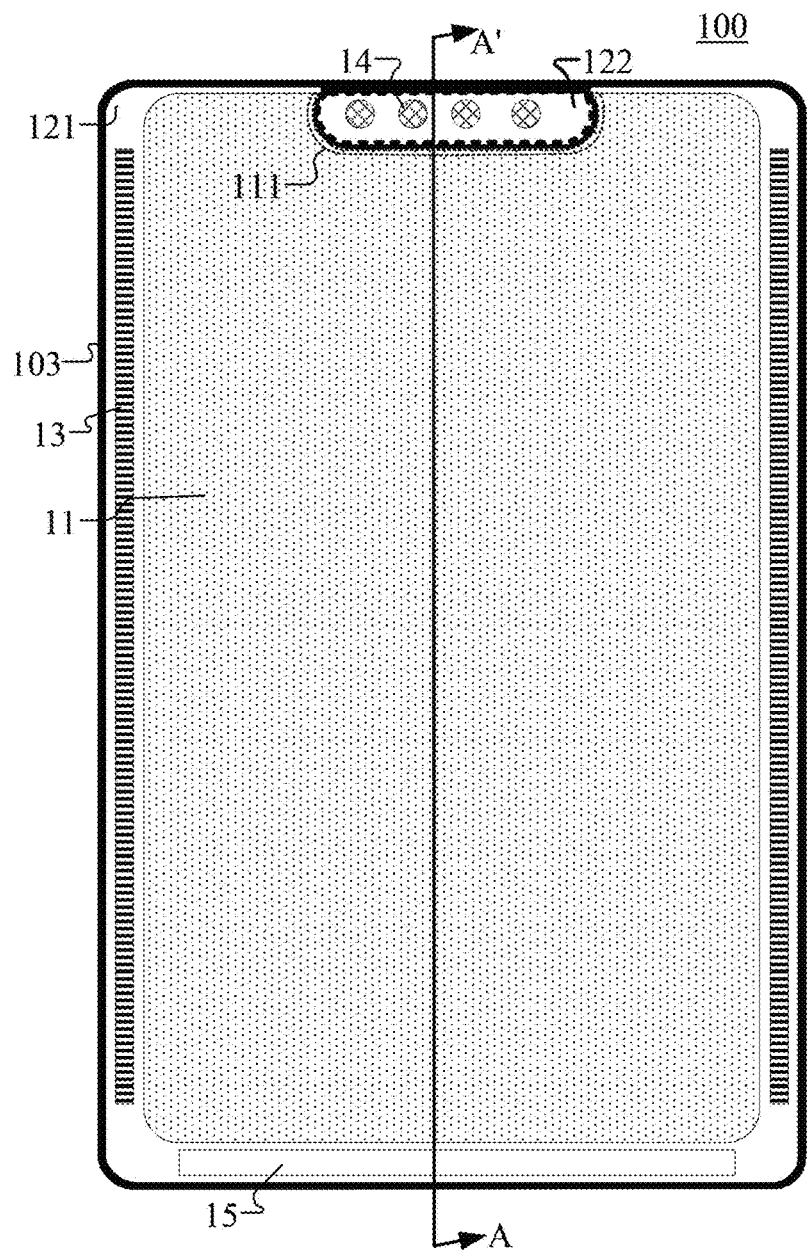
FIG. 1 shows an overlooking structure diagram of the display screen provided by an embodiment of the present disclosure.
Figure 2:
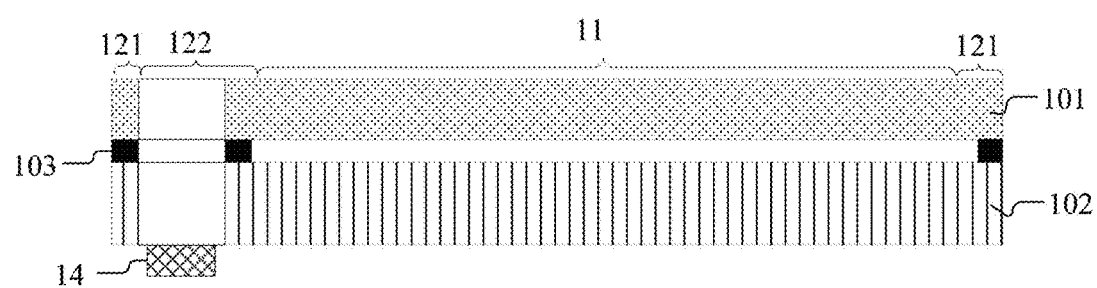
FIG. 2 shows a structure diagram of a cross section cut along a dotted line AN of the display screen shown in FIG. 1.

Referring to FIG. 1 and FIG. 2, FIG. 1 shows an overlooking structure diagram of the display screen provided by an embodiment of the present disclosure; and FIG. 2 shows a structure diagram of a cross section cut along a dotted line AN of the display screen shown in FIG. 1.

In the present embodiment, as shown in FIG. 1, the display screen 100 provided by the present embodiment includes a display area 11 and a non-display area. The display area 11 includes a first opening area 111, and the non-display area includes a first non-display area 121 and a second non-display area 122. Wherein, the second non-display area 122 is embedded in the first opening area 111. The first non-display area 121 surrounds the display area 11 and the second non-display area 122.

In addition, the display screen 100 includes a front sensor 14, a first substrate 101 and a second substrate 102. The first substrate 101 covers the display area 11, the first non-display area 121 and the second non-display area 122. The second substrate 102 covers the display area 11, the first non-display area 121 and the second non-display area 122. The front sensor 14 is arranged in the second non-display area 122. The first substrate 101 and the second substrate 102 allow light to pass through at respective positions corresponding to the second non-display area 122.

The first substrate 101 and the second substrate 102 are adhered together in the first non-display area through a frame sealant 103.

In other words, in order to improve the screen-to-body ratio of the display screen, the position where the front sensor 14 is arranged may be reserved as the non-display area, and the non-display areas at other positions are compressed. It also means that the display area 11 may extend to an area outside the position where the front sensor is arranged, and the shape of the formed display area 11 is no longer in a regular shape (e.g., regular rectangles, circles, etc.). In this way, the display screen 110 may have a high screen-to-body ratio, and the front sensor 14 may be arranged in the display screen at the same time.

In the present embodiment, because the non-display area is divided into the first non-display area 121 and the second non-display area 122, the first opening area 111 is arranged in the display area 11, the second non-display area 122 is embedded in the first opening area 111, and the front sensor 14 is arranged in the second non-display area 122, the arrangement of the front sensor in the display screen 100 cannot be influenced even if the width of the first non-display area 121 is reduced. Therefore, while the screen-to-body ratio of the display screen 100 is improved, the front sensor 14 may be arranged in the display screen 100 to achieve a corresponding additional function.

In the present embodiment, the first non-display area 121 and the second non-display area 122 may not be mutually communicated. In other words, the second non-display area 122 may be surrounded by the display area 11 and the first non-display area 121. In this way, the front sensor 14 may also be surrounded by the display area 11 and the first non-display area 121.

In addition, the first non-display area 121 and the second non-display area 122 may also be communicated. Meanwhile, the first non-display area 121 surrounds the second non-display area 122 and the display area 11, and the second non-display area 122 is embedded in the first opening area 111 of the display area 11, in other words, the second non-display area 122 is arranged in a frame of the display screen 100. Hence, the second non-display area may be arranged at any position of the display screen. Specifically, the second non-display area may be set according to needs of a user for the position of the front sensor.

Further, as shown in FIG. 1, the display screen 100 may include a first integrated circuit 15, and the first integrated circuit 15 and the front sensor 14 are arranged on two opposite sides of the display area 11. The first integrated circuit 15 may be used for providing a display signal to a data line arranged in the display area 11. In other words, the front sensor 14 is arranged on an upper frame of the display screen 100. When the front sensor 14 is an optical sensor, a user may use the optical sensor to shoot images conveniently.

In some implementations of the present embodiment, the second non-display area 122 is in the shape of one of a triangle, a rectangle, other polygons and a circle. The circle here may include an ellipse, a quasi-circle, and the like. Hence, the area in which the front sensor 14 is arranged may be of various shapes. The shape of the second non-display area 122 may be set in conjunction with requirements on the shape of the front sensor 14 and the screen-to-body ratio of the display screen 100, namely the shape of the area in which the front sensor 14 is arranged is set.

It should be appreciated that the display screen 100 may be a liquid crystal display screen or an organic light-emitting display screen. When the display screen shown in FIG. 1 is a liquid crystal display screen, the first substrate may be an array substrate, and the second substrate may be a color film substrate. When the display screen shown in FIG. 1 is an organic light-emitting display screen, the first substrate may be an array substrate, and the second substrate may be a sealing cover plate.

Figure 3:
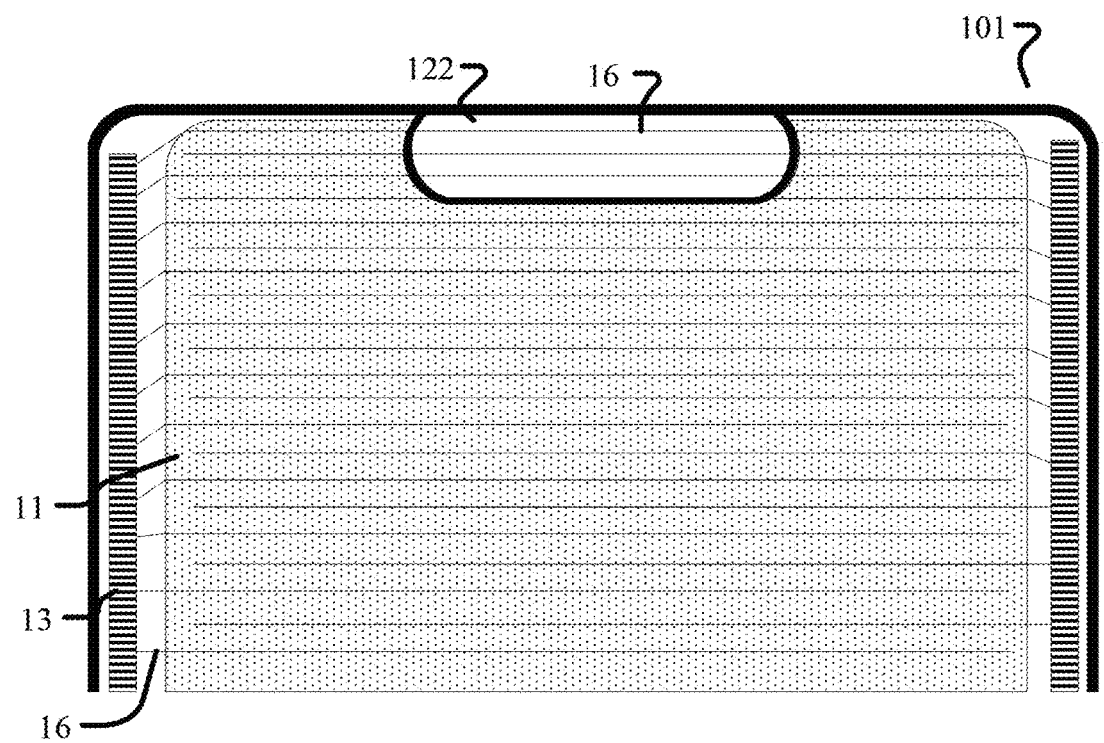
FIG. 3 shows a schematic diagram of a wire layout of part of scanning lines in the display screen shown in FIG. 1.

Referring to FIG. 3, it shows a schematic diagram of a wire layout of the scanning lines in the display screen shown in FIG. 1. In some implementations of the present embodiment, the first substrate 101 may include a second integrated circuit 13 and a plurality of scanning lines 16. The second integrated circuit 13 is at least arranged on one of other two opposite sides. The scanning line 16 provides a scanning signal to a gate of the thin-film transistor arranged in the display area 11. The second integrated circuit 13 provides a scanning signal to the scanning line 16. A part of a trace of at least one scanning line 16 is in the second non-display area 122. Because a part of the first substrate 101 corresponding to the position of the second non-display area 122 allows light to pass through but is not cut off, a part of the trace of the scanning line may be in the second non-display area 122 without bypassing the second non-display area. In this way, the area of the scanning line arranged on the display screen is relatively large, and the technical requirement of arranging the scanning line on the display screen is reduced.

Figure 4:
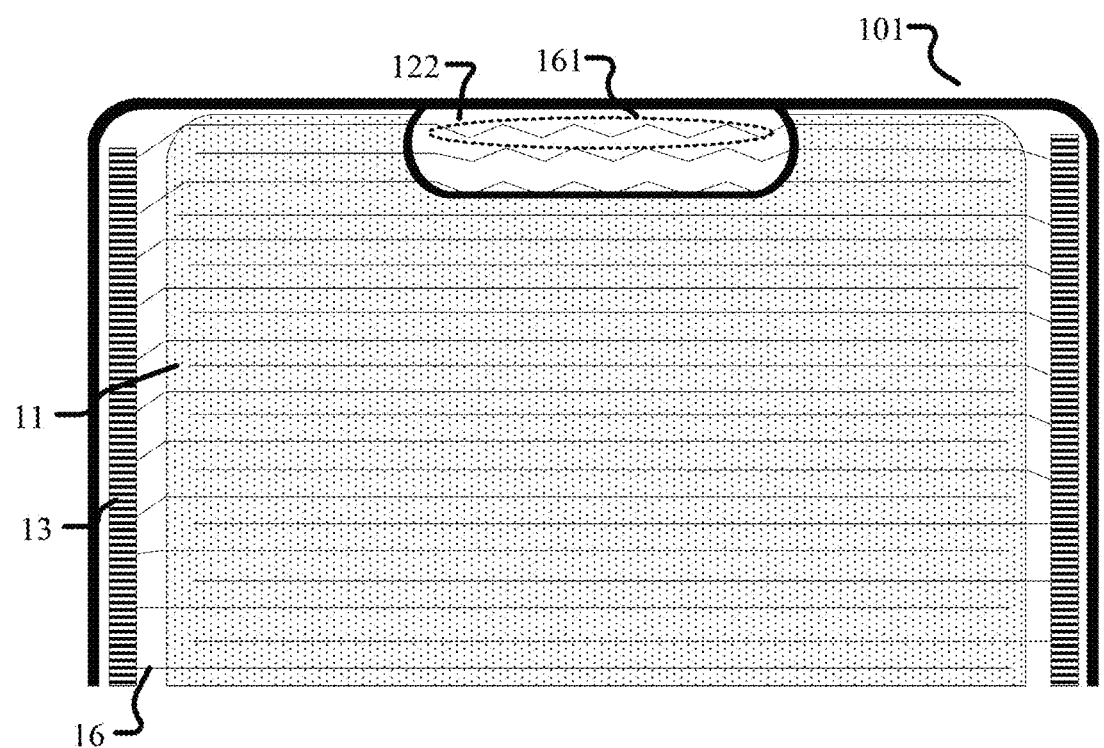
FIG. 4 shows a schematic diagram of another wire layout of part of the scanning lines in the display screen shown in FIG. 1.

Further, as shown in FIG. 4, it shows a schematic diagram of another wire layout of the scanning lines in the display screen shown in FIG. 1. Identical to the schematic diagram of the wire layout of the scanning lines shown in FIG. 3, the first substrate 101 may include a second integrated circuit 13 and a plurality of scan lines 16. The second integrated circuit 13 is at least arranged on one of other two opposite sides of the display area 11. The scanning line 16 provides a scanning signal to a gate of the thin-film transistor arranged in the display area 11. The second integrated circuit 13 provides a scanning signal to the scanning line 16. A part of the trace 161 of at least one scanning line 16 is in the second non-display area 122. Unlike the schematic diagram of the wire layout of the scanning lines shown in FIG. 3, in the second non-display area 122 shown in FIG. 4, a part of the trace 161 of the scanning line 16 in the second non-display area 122 is a fold line. A part of the trace 161 in the second non-display area 122 is set to be in the shape of a fold line, so that a phenomenon of non-uniform brightness of image signals detected by an optical sensor when a part of the trace of the scanning line 16 shown in FIG. 3 in the second non-display area 122 is a straight line may be relieved.

It should be appreciated that, when the second non-display area 122 is surrounded by the display area 11, a part of the trace of a data line (not shown in the Figs.) in the array substrate 101 may also be in the second non-display area 122. Further, a part of the trace of the data line in the second non-display area 122 may also be a fold line. The data line is used for providing signals to a source/drain electrodes of thin-film transistors arranged around the second non-display area.

Figure 5:
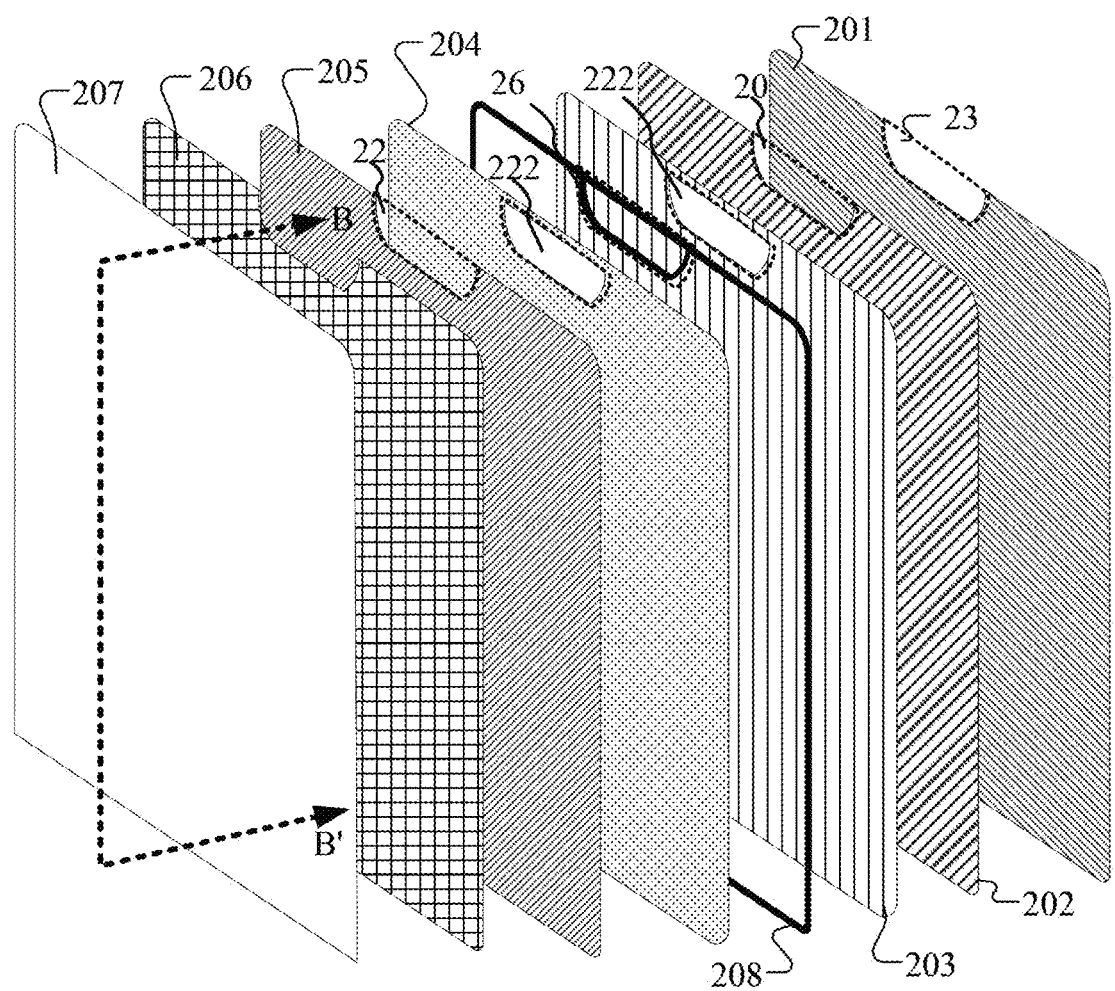
FIG. 5 shows a schematic diagram of a decomposition structure of the display screen shown in FIG. 1 when it is a liquid crystal display screen.
Figure 6:
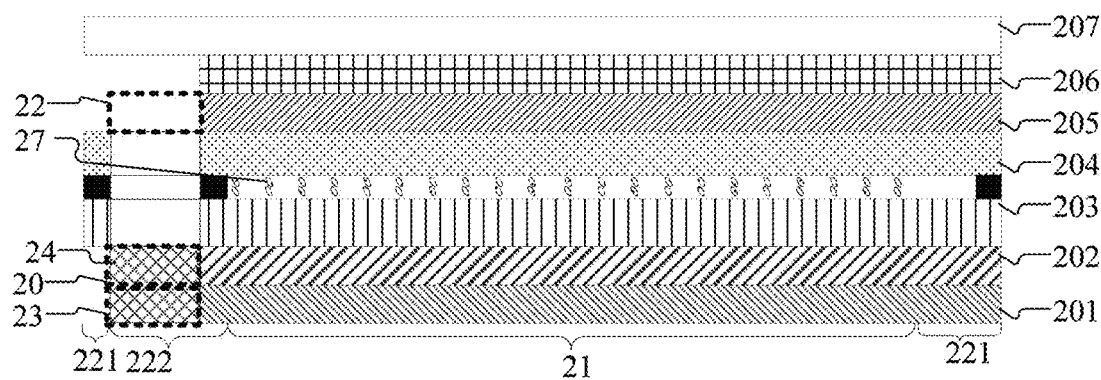
FIG. 6 shows a structure diagram of a cross section cut along a dotted line BB' of the liquid crystal display screen shown in FIG. 5.

Referring to FIG. 5 and FIG. 6, FIG. 5 shows a schematic diagram of a decomposition structure of the display screen, shown in FIG. 1, when it is a liquid crystal display screen; and FIG. 6 shows a structure diagram of a cross section cut along a dotted line BB' of the liquid crystal display screen shown in FIG. 5.

The liquid crystal display screen 200 includes a backlight unit 201, a first polarizer 202, a first substrate 203, a second substrate 204, and a second polarizer 205. Wherein, the first substrate 203 may be an array substrate, and the second substrate 204 may be a color film substrate.

The first substrate 203 and the second substrate 204 allow light to pass through at respective positions in the second non-display area 222.

The first polarizer 202 is arranged on a side of the first substrate 203 away from the second substrate 204, and a first through hole 21 is formed in the first polarizer 202 at the position of the second non-display area 222.

The second polarizer 205 is arranged on a side of the second substrate 204 away from the first substrate 203, and a second through hole 22 is formed in the second polarizer 205 at the position of the second non-display area 222.

The backlight unit 201 is arranged on a side of the first polarizer 202 away from the first substrate 203, and a third through hole 23 is formed in the backlight unit 201 at the position of the second non-display area 222.

In the display area 21, liquid crystal 27 may be filled between the first substrate 203 and the second substrate 204. For example, when an electric signal is applied to the first substrate 203 to form a horizontal electric field, the liquid crystal 27 is rotated under the action of the horizontal electric field. The light emitted by the backlight unit 201 enters the liquid crystal 27 after passing through the first polarizer 202, then enters the second polarizer by passing through the liquid crystal rotated for a certain angle, and goes out after being polarized by the second polarizer, so that the liquid crystal display screen displays a corresponding image.

In the present embodiment, the second non-display area 222 includes a frame sealant area 26 arranged around the inner edge of the second non-display area 222. The first substrate 203 and the second substrate 204 are sealed together in the frame sealant area 26 by using a frame sealant 208. In addition, the first substrate 203 and the second substrate 204 may be sealed together in the first non-display area 221 by using the frame sealant 208. It should be appreciated that, as shown in FIG. 5, the frame sealant area 26 of the second non-display area 222 and the frame sealant 208 coated in the first non-display area 221 may have an overlapped part.

Because the third through hole 23 and the first through hole 21 are formed in the backlight unit 201 and the first polarizer 202 at the position of the second non-display area 222 respectively, the front sensor 24, for example a light sensor, may be arranged in a space defined by the third through hole 23 and the first through hole 21.

In addition, the liquid crystal display screen 200 may further include packaging glass 207 arranged on a side of the second polarizer 605 away from the second substrate 604. The packaging glass 207 and the second polarizer may be adhered together through the first optical adhesive 206.

In the present embodiment, in the second non-display area 222, nothing may be filled between the first substrate 203 and the second substrate 204. In this way, in the second non-display area 222, external light may be irradiated to the second substrate 204 through the second through hole 22, then is transmitted in a light-permeable area of the second substrate 204, a cavity formed between the light-permeable area of the second substrate 204 and a light-permeable area of the first substrate 203, and the light-permeable area of the first substrate 203, and finally enters the optical sensor which senses the light to form an image.

According to the liquid crystal display screen provided by the present embodiment, the backlight unit, the first polarizer, and the second polarizer are provided with a through hole at a position corresponding to the second non-display area respectively, and moreover, the first substrate and the second substrate allow light to pass through at respective positions in the second non-display area, thus, in the liquid crystal display screen, the front sensor, for example an optical sensor, arranged in the second non-display area may detect external optical signals. Meanwhile, the width of the first non-display area may also be reduced to improve the screen-to-body ratio of the liquid crystal display screen.

Figure 7:
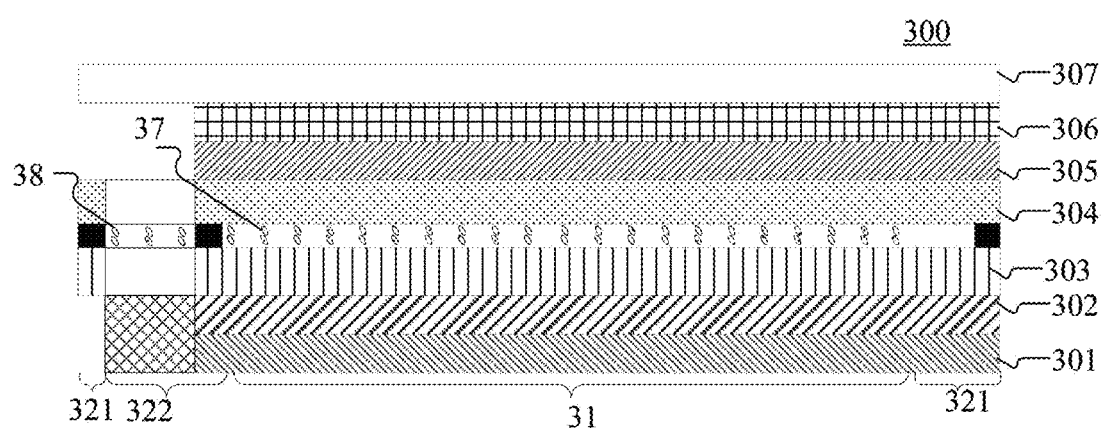
FIG. 7 shows a structure diagram of another cross section cut along a dotted line BB' of the liquid crystal display screen shown in FIG. 5.

Referring to FIG. 7, it shows a structure diagram of another cross section cut along a dotted line BB' of the liquid crystal display screen shown in FIG. 5.

Unlike the liquid crystal display screen 220 shown in FIG. 6, in the liquid crystal display screen 300 shown in FIG. 7, the space between the second non-display area 322 of the first substrate 303 and the second non-display area 322 of the second substrate 304 may be filled with a transparent material 38. A transparent material 38 with the refractive index close to that of a component material (e.g., glass with the refractive index of 1.45-1.65) of the light-permeable area of the first substrate 303 and close to that of a component material (e.g., glass) of the light-permeable area of the second substrate 304 may be selected as a filling material filled in the space between the second non-display area 322 of the first substrate 303 and the second non-display area 322 of the second substrate 304. In this way, the loss of the light, caused by light refraction when the light is transmitted in the space between the second non-display area 322 of the first substrate 303 and the second non-display area 322 of the second substrate 304, may be reduced. The intensity of the light detected by the optical sensor may be improved.

In some implementations of the present embodiment, the above transparent material 38, for example, may be liquid crystal. Compared with air, the refractive index of the liquid crystal is close to that of the component material (e.g., glass) of the light-permeable area of the first substrate 303 and that of the component material (e.g., glass) of the light-permeable area of the second substrate 304. The liquid crystal is used as the transparent material filled in the space between the second non-display area 322 of the first substrate 303 and the second non-display area 322 of the second substrate 304, so that the intensity of the light detected by the optical sensor may be improved, and the manufacturing process of the liquid crystal display screen may be simplified.

Filling the space between the second non-display area 322 of the first substrate 303 and the second non-display area 322 of the second substrate 304 with the liquid crystal may include: coating the frame sealant 308 on the second substrate 304, and coating the frame sealant in the frame sealant area arranged along the edge of the second non-display area 322. The frame sealant area arranged along the edge of the second non-display area 322 may be an airtight area. The liquid crystal is coated in the display area 31 and the second non-display area 322 of the first substrate 303, and then the first substrate 303 and the second substrate 304 are bonded together through vacuum. In this way, the second non-display area 322 and the display area 31 of the formed liquid crystal display screen 300 are filled with the liquid crystal.

Figure 8:
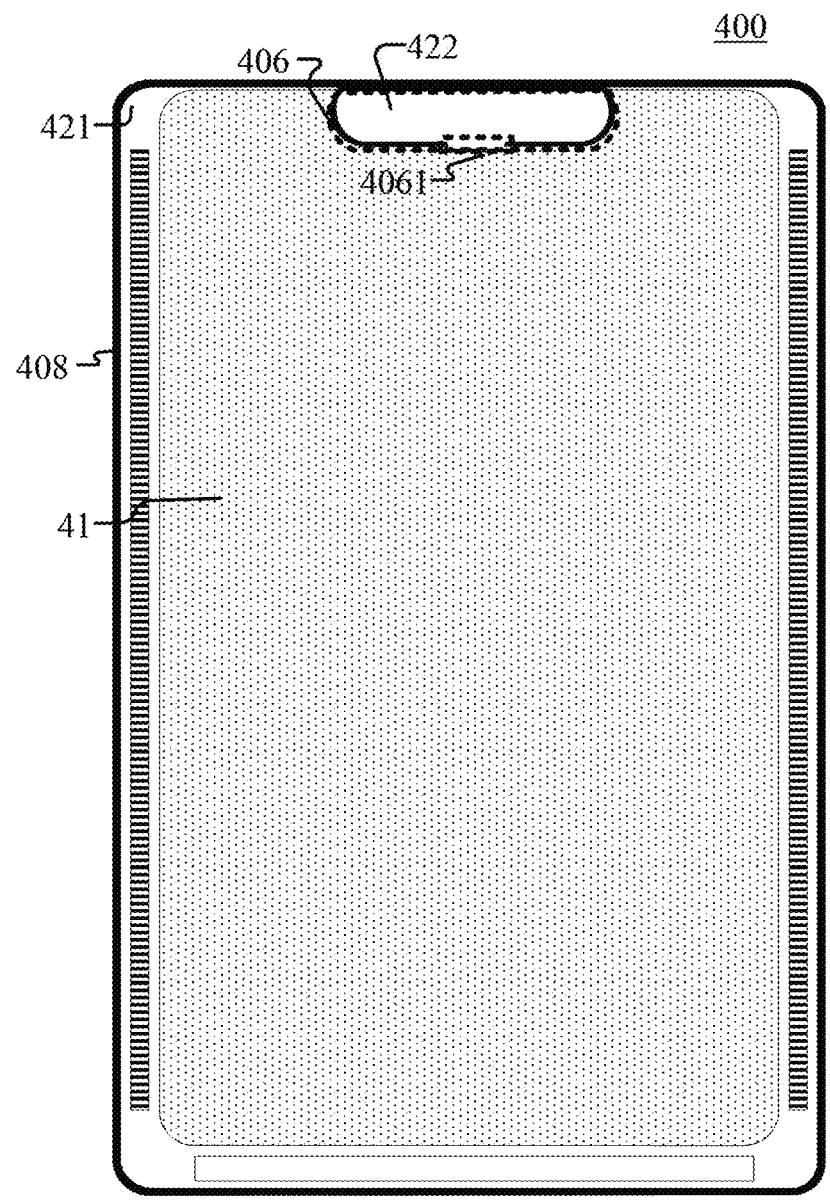
FIG. 8 shows a top view of the liquid crystal display screen shown in FIG. 5.

Referring now to FIG. 8, it shows a top view of the liquid crystal display screen shown in FIG. 5. As shown in FIG. 8, the liquid crystal display screen 400 includes the display area 41, the first non-display area 421 and the second non-display area 422. The liquid crystal display screen 400 further includes the frame sealant 408 arranged in the first non-display area 421 used for sealing the first substrate 403 and the second substrate 404. The frame sealant area 406 arranged along the edge of the second non-display area 422 in the second non-display area 422 is provided with an opening 4061 on a side facing the display area. The frame sealant is arranged in the frame sealant area 406 along the edge of the second non-display area 422. Meanwhile, the frame sealant exposes the opening 4061. When the space between the second non-display area 422 of the first substrate 403 and the second non-display area 422 of the second substrate 404 needs to be filled with the liquid crystal, the following steps may be adopted: coating the liquid crystal in the display area 41 of the first substrate 403; then, performing vacuum bonding on the first substrate 403 and the second substrate 404; and finally, injecting the liquid crystal into the space between the second non-display area 422 of the first substrate 403 and the second non-display area 422 of the second substrate 404 through the opening 4061. In this way, the badness of liquid crystal leakage caused by direct coating of the liquid crystal in the second non-display area 422 may be avoided.

Figure 9:
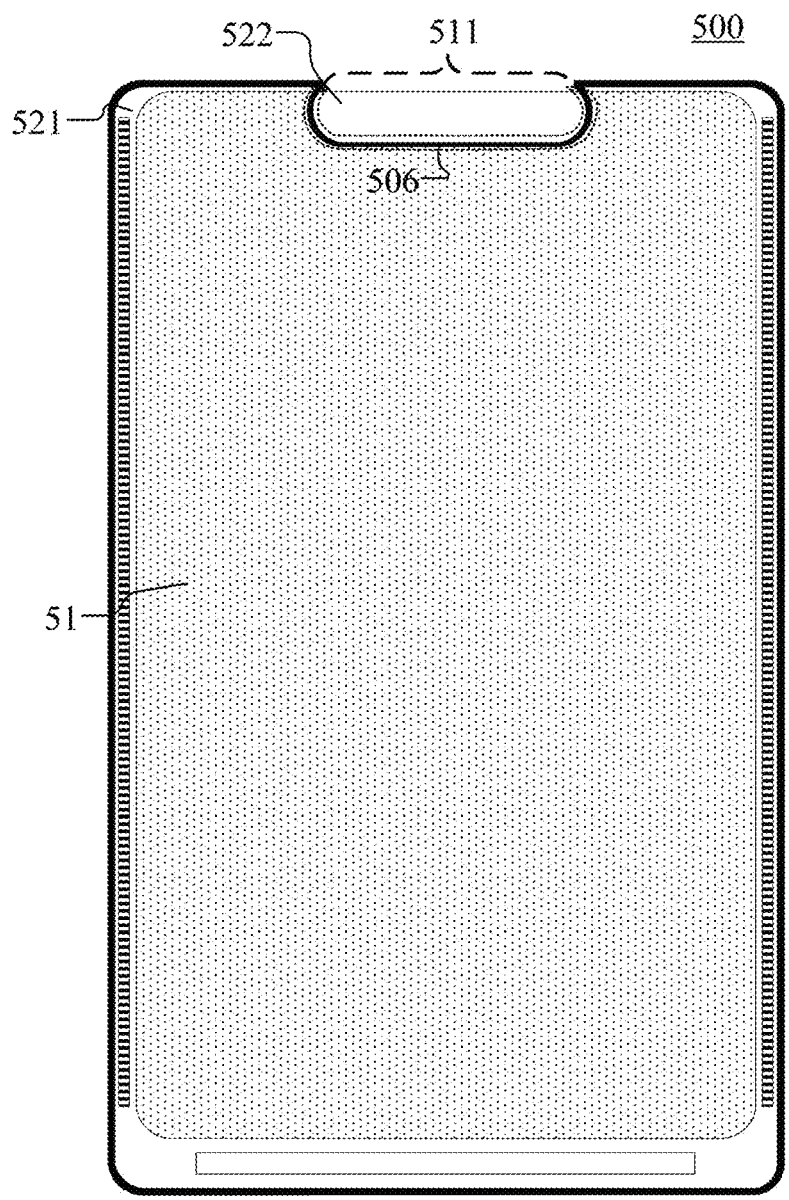
FIG. 9 shows a structure diagram of another cross section cut along a dotted line BB' of the liquid crystal display screen shown in FIG. 5.

Referring to FIG. 9, it shows a structure diagram of another cross section cut along a dotted line BB' of the liquid crystal display screen shown in FIG. 5.

As shown in FIG. 9, the liquid crystal display screen 500 includes the frame sealant area 506 arranged along the edge of the second non-display area 522 and communicated with the second non-display area 522 and the first opening area 511. The first substrate and the second substrate are sealed together in the frame sealant area by using a frame sealant. Likewise, the first substrate and the second substrate allow light to pass through at respective positions in the second non-display area 522. Thus, the front sensor, for example an optical sensor, arranged in the second non-display area 522 may detect the optical signals transmitted through the light-permeable area of the first substrate and the light-permeable area of the second substrate. Meanwhile, the width of the first non-display area 521 of the liquid crystal display screen shown in FIG. 9 may be reduced without influencing the front sensor arranged in the liquid crystal display screen. In addition, the frame sealant area 506 communicated with the second non-display area 522 and the first opening area 511 is arranged along the edge of the second non-display area 522, so that compared with the frame sealant area arranged surrounding the second non-display area, the manufacturing process may be simplified, the usage amount of the frame sealant may be reduced, and the manufacturing cost of the display screen may be reduced.

Figure 10:
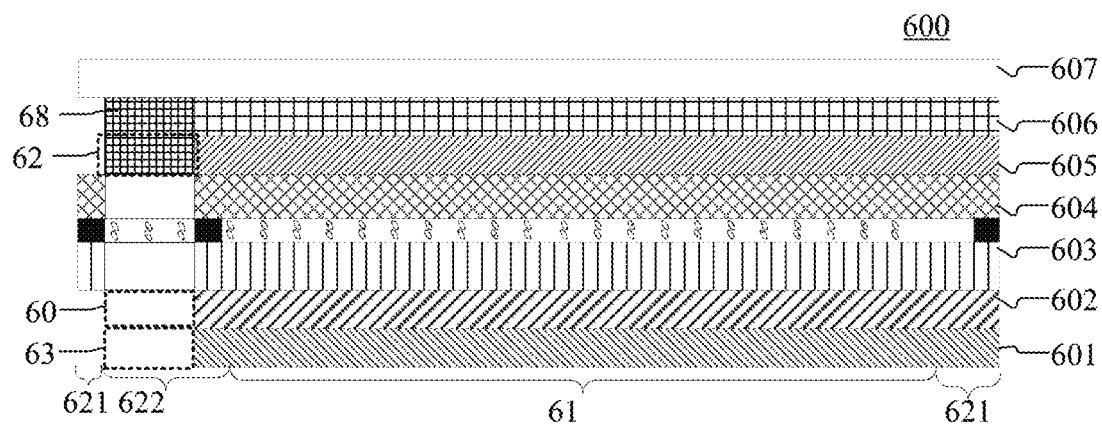
FIG. 10 shows a structure diagram of another cross section cut along a dotted line BB' of the liquid crystal display screen shown in FIG. 5.

Referring to FIG. 10, it shows a structure diagram of another cross section cut along a dotted line BB' of the liquid crystal display screen shown in FIG. 5.

As shown in FIG. 10, the liquid crystal display screen 600 includes a backlight unit 601, a first polarizer 602, a first substrate 603, a second substrate 604, a second polarizer 605 and packaging glass 607. The second polarizer 605 and the packaging glass 607 are adhered together by using a first optical adhesive 606.

The liquid crystal display screen 600 also includes a display area 61, a first non-display area 621 and a second non-display area 622. In the liquid crystal display screen 600, the backlight unit 601 and the first polarizer 602 are provided with a third through hole 63 and a first through hole 60 at respective positions in the second non-display area 622. The first substrate 603 and the second substrate 604 allow light to pass through at respective positions in the second non-display area 622. The second polarizer 605 is provided with a second through hole 62 at a position in the second non-display area 622.

In the present embodiment, the second through hole 62 is filled with a second optical adhesive 68 contacting the second substrate 604 and the first optical adhesive 606. Further, the second optical adhesive 68 may have an identical material with the first optical adhesive 606. In the second non-display area 622, a gap between the second substrate 604 and the packaging glass 607 is filled up with the second optical adhesive 68.

The second through hole 62 is filled with the second optical adhesive 68 contacting the second substrate 604, the first optical adhesive 606 and the packaging glass 607. In this way, the gap between the second substrate 604 and the packaging glass 607 is filled up with the optical adhesive, and because the refractive index of the optical adhesive, compared with air, is closer to that of the light-permeable area (e.g., glass) of the second substrate 604 and that of the packaging glass 607, the loss caused by refraction when light is transmitted between the packaging glass and the second substrate may be reduced. The intensity of optical signals that may be detected by the front sensor for example an optical sensor may be improved.

Figure 11A:
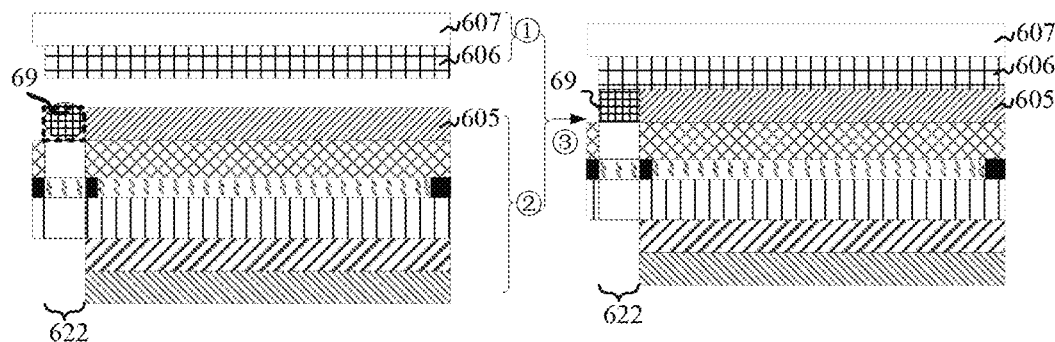
FIG. 11A shows a schematic diagram of steps of an implementation of filling the second through hole of the liquid crystal display screen shown in FIG. 10 with a second optical adhesive.

Referring to FIG. 11A, it shows a schematic diagram of steps of an implementation of filling the second through hole of the liquid crystal display screen shown in FIG. 10 with the second optical adhesive.

As shown in FIG. 11A, Step ①, the first optical adhesive 606 is attached to the packaging glass; Step ②, the second through hole 62 is filled with a certain amount of the liquid optical adhesive material 68, and then the liquid optical adhesive material 68 in the second through hole 62 is solidified; and Step ③, the packaging glass 607 attached with the first optical adhesive 606 and the second polarizer 605 with the second through hole 62 filled with the optical adhesive material 68 are fitted together under a vacuum environment, and finally, the optical adhesive material is subjected to thermal solidification to form the second optical adhesive. The first optical adhesive 606 and the second optical adhesive are closely fitted in the above process. In other words, the second optical adhesive 68 in the second through hole 62 is formed by solidifying a liquid optical adhesive material dripped in the second through hole 62. Therefore, in the second non-display area 622, the gap between the packaging glass 607 and the second substrate 605 is filled up with the optical adhesive, on the first hand, the packaging glass 607 and the second substrate 605 can be fitted closely, and on the other hand, a phenomenon of weakened light intensity due to refraction of light transmitted from the packaging glass 607 to the second substrate 605 in the second non-display area 622 may be reduced.

Therefore, in the second non-display area 622, the gap between the packaging glass 607 and the second substrate 605 is filled up with the optical adhesive, on the first hand, the packaging glass 607 and the second substrate 605 can be fitted closely, and on the other hand, a phenomenon of weakened light intensity due to refraction of light transmitted from the packaging glass 607 to the second substrate 605 in the second non-display area 622 may be reduced.

Figure 11B:
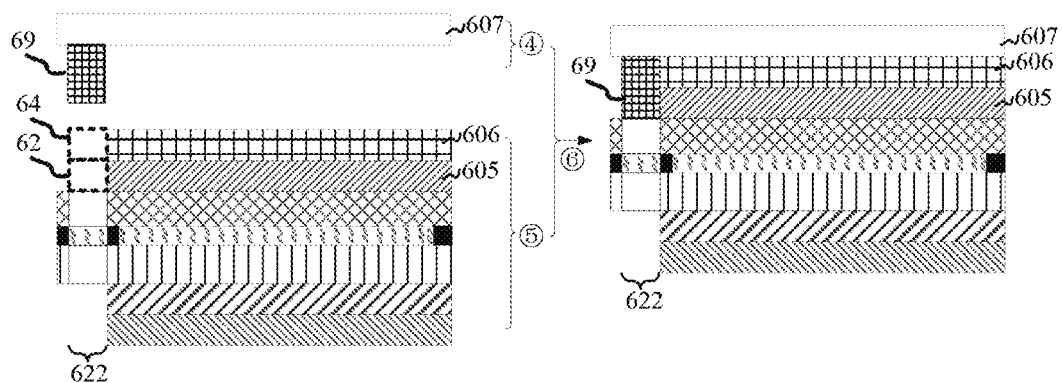
FIG. 11B shows a schematic diagram of steps of another implementation of filling the second through hole of the liquid crystal display screen shown in FIG. 10 with a second optical adhesive.

Referring to FIG. 11B, it shows a schematic diagram of steps of another implementation of filling the second through hole of the liquid crystal display screen shown in FIG. 10 with the second optical adhesive.

As shown in FIG. 11B, Step ④, the second optical adhesive 609 is attached to the packaging glass at a position in the second non-display area 622; Step ⑤, the fourth through hole 64 is formed in the first optical adhesive 606 fitted together with the second polarizer 605; and Step ⑥, under a vacuum environment, the packaging glass 607 and the second substrate 605 are fitted together, and the second optical adhesive 69 is pressed into the second through hole 62 and the fourth through hole 64. In the process shown in FIG. 11B, the thickness of the second optical adhesive 69 may be greater than the sum of the depths of the fourth through hole 64 and the second through hole 62. Therefore, it is ensured that the second optical adhesive 609 may be fitted in the second through hole 62 and the fourth through hole 64 seamlessly. The second optical adhesive 69 used in the process shown in FIG. 11B may be formed from a semi-solid optical material and is adhesive on double sides.

Figure 11C:
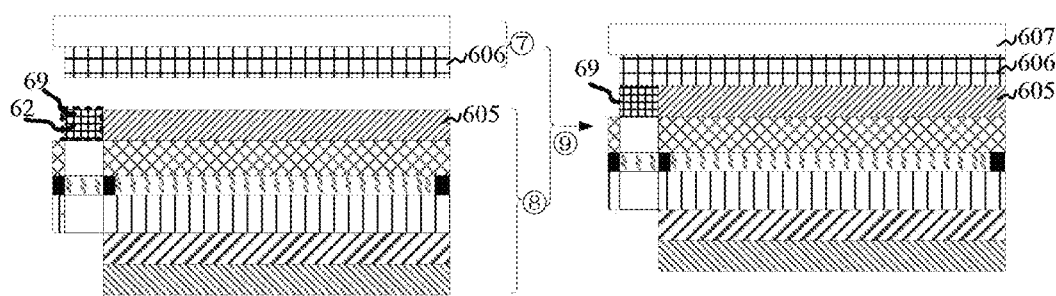
FIG. 11C shows a schematic diagram of steps of another implementation of filling the second through hole of the liquid crystal display screen shown in FIG. 10 with a second optical adhesive.

Referring to FIG. 11C, it shows a schematic diagram of steps of another implementation of filling the second through hole of the liquid crystal display screen shown in FIG. 10 with the second optical adhesive.

As shown in FIG. 11C, Step ⑦, the first optical adhesive 606 is attached to the packaging glass 607; Step ⑧, the second optical adhesive 69 is attached in second through hole 62; and Step ⑨, under a vacuum environment, the packaging glass 607 and the second substrate 605 are fitted together, and the second optical adhesive 69 contacts the first optical adhesive 606. In the process shown in FIG. 11C, the thickness of the second optical adhesive 69 may be greater than the depth of the second through hole 62. Therefore, it is ensured that the second optical adhesive 69 and the first optical adhesive 606 are fitted with each other seamlessly.

In some application scenarios, the second optical adhesive 69 used in the process shown in FIG. 11C may be formed from a semi-solid optical material and is adhesive on double sides. Further, the material for forming the first optical adhesive is identical with the material for forming the second optical adhesive, and in addition, the process for forming the first optical adhesive may be identical with the process for forming the second optical adhesive.

In some other application scenarios, the second optical adhesive 69 used in the process shown in FIG. 11C may be a hard coating film coated with an optical adhesive on a side adjacent to the second substrate 605. Moreover, the thickness of the second optical adhesive 69 may be greater than that of the second through hole 62.

Figure 12:
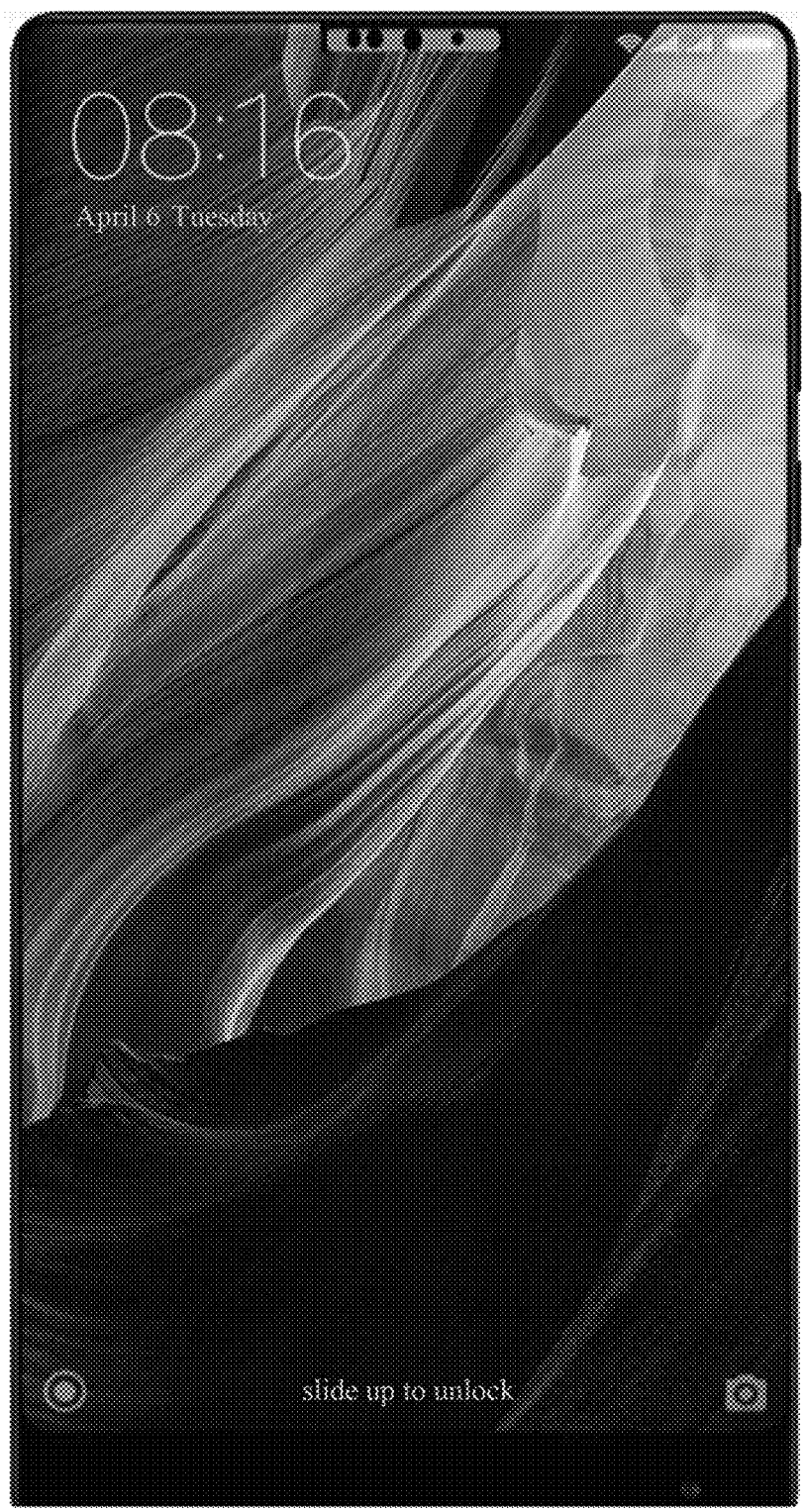
FIG. 12 shows a schematic diagram of the display device provided by an embodiment of the present disclosure.

Referring to FIG. 12, it shows a schematic diagram of the display device provided by an embodiment of the present disclosure.

As shown in FIG. 12, the display device 700, for example, may be a mobile phone, and includes the display screen shown in FIG. 1, FIG. 2, and FIG. 5-FIG. 10. As shown in FIG. 12, the display device utilizing the display screen shown in FIG. 1, FIG. 2, and FIG. 5-FIG. 10 has a large screen-to-body ratio in display, and meanwhile, a front sensor may be arranged in the display screen.

In addition, the display device 700 may further be various types of electronic devices, for example, an intelligent tablet computer, an e-book reader, an MP3 player (Moving Picture Experts Group Audio Layer III), an MP4 player (Moving Picture Experts Group Audio Layer IV), a laptop computer, a desktop computer, and the like.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A display screen, comprising:
 a display area and a non-display area, wherein the display area comprises:
 a first opening area, and
 the non-display area comprises:
 a first non-display area and a second non-display area; the second non-display area is embedded in the first opening area;
 the first non-display area surrounds the display area and the second non-display area;
 the display screen further comprises:
 a front sensor, a first substrate and a second substrate;
 the first substrate covers the display area, the first non-display area and the second non-display area, the second substrate covers the display area, the first non-display area and the second non-display area, and the front sensor is arranged in the second non-display area,
 wherein the first substrate and the second substrate allow light to pass through at respective positions corresponding to the second non-display area; and
 wherein at least one cavity is formed between the first substrate and the second substrate at a position corresponding to the second non-display area, and the at least one cavity does not penetrate through the first substrate and the second substrate;
 wherein the display screen is a liquid crystal display screen further comprising a first polarizer, a second polarizer and a backlight unit;

the first polarizer is arranged on a side of the first substrate away from the second substrate, and a first through hole is formed in the first polarizer at a position corresponding to the second non-display area;

the second polarizer is arranged on a side of the second substrate away from the first substrate, and a second through hole is formed in the second polarizer at a position corresponding to the second non-display area;

the backlight unit is arranged on a side of the first polarizer away from the first substrate, and a third through hole is formed in the backlight unit at a position corresponding to the second non-display area; and the first substrate is an array substrate, and the second substrate is a color film substrate;

the display screen further comprises:

packaging glass arranged on a side of the second polarizer away from the second substrate, wherein the packaging glass and the second polarizer are adhered together by using a first optical adhesive; and the second through hole is filled with a second optical adhesive contacting the second substrate and the first optical adhesive.

2. The display screen according to claim 1, wherein the first non-display area is in communication with the second non-display area.

3. The display screen according to claim 1, wherein the second non-display area is in a shape of one of: a triangle, a rectangle, a polygon or a circle.

4. The display screen according to claim 1, wherein the second non-display area comprises a frame sealant area surrounding an inner edge of the second non-display area, and the first substrate and the second substrate are sealed together by using a frame sealant in the frame sealant area.

5. The display screen according to claim 4, wherein a space between the second non-display area of the first substrate and the second non-display area of the second substrate is filled with a transparent material.

6. The display screen according to claim 5, wherein the transparent material is liquid crystal.

7. The display screen according to claim 4, wherein the frame sealant area is provided with an opening on a side facing the display area.

8. The display screen according to claim 1, wherein the second non-display area comprises a frame sealant area arranged along an edge of the second non-display area adjacent to the first opening area, and the frame sealant area has an identical shape with the first opening area, and the first substrate and the second substrate are sealed together by using a frame sealant in the frame sealant area.

9. The display screen according to claim 1, further comprising a first integrated circuit, wherein the display area has two pairs of opposite sides, and the first integrated circuit and the sensor are arranged on a pair of opposite sides of the display area, respectively.

10. The display screen according to claim 9, wherein the first substrate comprises:

a second integrated circuit and a plurality of scanning lines, and the second integrated circuit is arranged on at least one side of the other pair of opposite sides of the display area, the second integrated circuit provides a scanning signal for the scanning lines; and a part of at least one of the scanning lines is in the second non-display area.

11. The display screen according to claim 10, wherein at least one of the plurality of scanning lines in the second non-display area is a fold line.

12. The display screen according to claim 1, wherein the second optical adhesive is identical to a material of the first optical adhesive.

13. The display screen according to claim 12, wherein the second optical adhesive is formed by solidifying a liquid optical adhesive material dripped in the second through hole.

14. The display screen according to claim 12, wherein the second optical adhesive is formed from a semi-solid optical adhesive material and is adhesive on double sides.

15. The display screen according to claim 12, wherein the second optical adhesive and the first optical adhesive are bonded together through vacuum.

16. The display screen according to claim 1, wherein the second optical adhesive is a hard coating film and is coated with an optical adhesive on a side adjacent to the second substrate.

17. The display screen according to claim 1, further comprising packaging glass arranged on a side of the second polarizer away from the second substrate, wherein the packaging glass and the second polarizer are adhered together by using a first optical adhesive;

the first optical adhesive is formed with a fourth through hole in the second non-display area;

the second through hole and the fourth through hole are filled with a second optical adhesive; and the second optical adhesive contacts the second substrate and the packaging glass.

18. A display device, comprising:

a display screen, wherein the display screen comprises a display area and a non-display area, the display area comprises:

a first opening area, and the non-display area comprises:

a first non-display area and a second non-display area; the second non-display area is embedded in the first opening area;

the first non-display area surrounds the display area and the second non-display area;

the display screen further comprises:

a front sensor, a first substrate and a second substrate; the first substrate covers the display area, the first non-display area and the second non-display area, the second substrate covers the display area, the first non-display area and the second non-display area, and the front sensor is arranged in the second non-display area, wherein the first substrate and the second substrate allow light to pass through at respective positions corresponding to the second non-display area; and wherein at least one cavity is formed between the first substrate and the second substrate at a position corresponding to the second non-display area, and the at least one cavity does not penetrate through the first substrate and the second substrate;

wherein the display screen is a liquid crystal display screen further comprising a first polarizer, a second polarizer and a backlight unit;

the first polarizer is arranged on a side of the first substrate away from the second substrate, and a first through hole is formed in the first polarizer at a position corresponding to the second non-display area;

the second polarizer is arranged on a side of the second substrate away from the first substrate, and a second through hole is formed in the second polarizer at a position corresponding to the second non-display area;

the backlight unit is arranged on a side of the first polarizer away from the first substrate, and a third through hole is formed in the backlight unit at a position corresponding to the second non-display area; and the first substrate is an array substrate, and the second substrate is a color film substrate;

the display screen further comprises:

packaging glass arranged on a side of the second polarizer away from the second substrate, wherein the packaging glass and the second polarizer are adhered together by using a first optical adhesive; and the second through hole is filled with a second optical adhesive contacting the second substrate and the first optical adhesive.

19. The display device according to claim 18, wherein a space of the at least one blind hole is filled with a transparent material.

* * * * *